United States Patent
Bowman et al.

(10) Patent No.: US 6,298,932 B1
(45) Date of Patent: Oct. 9, 2001

(54) WHEEL ASSEMBLY FOR A VEHICLE

(75) Inventors: Larry W. Bowman, Troy; Patrick D. Laper, Rochester; Raji S. El-Kassouf, Sterling Heights; Michael G. Semke, Novi; Richard M. Clisch, Canton; Gary P. Ford, Rochester, all of MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/498,404

(22) Filed: Feb. 4, 2000

(51) Int. Cl.$^7$ ........................................................ B60K 7/00
(52) U.S. Cl. ........................................ 180/6.5; 180/65.5
(58) Field of Search ........................ 180/6.48, 6.5, 180/65.5

(56) References Cited

U.S. PATENT DOCUMENTS

| | | |
|---|---|---|
| 2,353,730 | 7/1944 | Joy . |
| 2,748,879 | 6/1956 | Bailey . |
| 4,799,564 | * 1/1989 | Iijima et al. ................... 180/65.5 |
| 5,058,016 | * 10/1991 | Davidovitch .................... 701/22 |
| 5,258,912 | * 11/1993 | Ghoneim et al. ................ 701/42 |
| 5,624,004 | * 4/1997 | Watanabe ....................... 180/168 |
| 5,894,902 | * 4/1999 | Cho ................................ 180/65.5 |

* cited by examiner

Primary Examiner—Kevin Hurley
(74) Attorney, Agent, or Firm—Carlson, Gaskey, Olds

(57) ABSTRACT

A multi-disc wheel assembly for a vehicle is provided. The multi-disc wheel assembly includes a plurality of narrow discs assemblies that form a wheel assembly. The plurality of narrow disc assemblies include first and second narrow disc assemblies. A first independent drive mechanism applies a rotational force to the first narrow disc assembly to produce a first speed. A second independent drive mechanism applies a rotational force to the second narrow disc assembly to produce a second speed unequal to the first speed during a vehicle turn to minimize wheel assembly scrub.

14 Claims, 1 Drawing Sheet

WHEEL ASSEMBLY FOR A VEHICLE

BACKGROUND OF THE INVENTION

This invention relates to a wheel assembly for a vehicle, and more specifically, the invention relates to a wheel assembly particularly useful for vehicles which frequently make tight turns.

Axle assemblies having dual wheels on either end have been used to increase the load bearing capability of heavy duty vehicles. Typically the pair of wheels on each end of the axle assembly are secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Sharper turns cause increased tire scrub. This problem is compounded because wheels with very large tires have a wide footprint. Different portions of the tire's footprint must travel different distances throughout the turning radius. That is, the outside of the tire must rotate a greater distance than the inside of the tire.

Tire wear and maintenance on heavy duty lift trucks due to scrub cost thousands of dollars annually per vehicle. A dual wheel assembly design has been proposed that uses hydraulic motors to independently drive each wheel. However, the design uses the operation of the suspension to reduce scrubbing and is not suitable for heavy vehicle applications. Furthermore, the hydraulic motors are not individually controlled so that the wheels cannot be rotatingly driven at different speeds relative to one another to travel along different radial distances and reduce scrubbing during vehicle turns. Therefore, what is needed is a wheel assembly with independently rotatable wheels that is also capable of reducing scrubbing across the width of each tire.

SUMMARY OF THE INVENTION AND ADVANTAGES

The present invention provides a multi-disc wheel assembly for a vehicle that includes a plurality of narrow discs assemblies that form a wheel assembly. The plurality of narrow disc assemblies include first and second narrow disc assemblies. A first independent drive mechanism applies a rotational force to the first narrow disc assembly to produce a first speed. A second independent drive mechanism applies a rotational force to the second narrow disc assembly to produce a second speed unequal to the first speed during a vehicle turn to minimize wheel assembly scrub.

Accordingly, the above invention provides a wheel assembly with independently rotatable wheels that is also capable of reducing scrubbing across the width of each tire.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
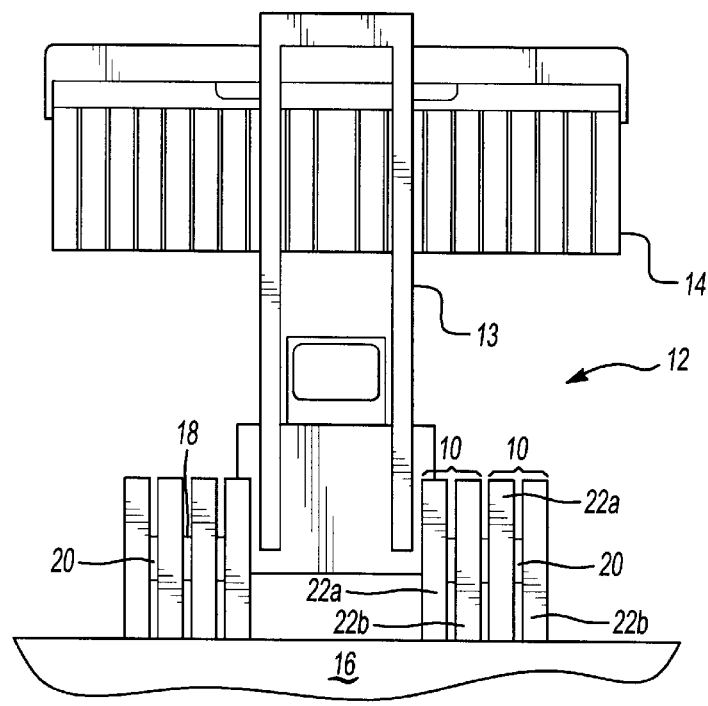
FIG. 1 is a front view of a vehicle utilizing one embodiment of the present invention wheel assembly.

A multi-disc wheel assembly 10 for a vehicle 12, such as a heavy lift truck, is shown in FIG. 1. Heavy lift trucks 12, like the one shown, have a lift mechanism 13 and are used for lifting very heavy loads, such as a sea container 14. Heavy lift trucks 10 typically have a rather wide wheel base with wide, non-steerable front wheels for supporting the load on a road surface 16. The multi-disc wheel assemblies 10 of the present invention are an improvement over conventional wheel assemblies, which experience a significant amount of tire wear due to scrub. Preferably, the wheel assembly 10 has a width that is approximately equal to a conventional wheel assembly width for a heavy lift truck. It should be appreciated that the present invention wheel assembly 10 may be suitable for any vehicle application having wide tires that undergo a significant amount of turning.

The vehicle 10 has an axle assembly 18 with opposing ends 20 that may support multiple wheel assemblies 10 depending upon the load requirements of the particular vehicle. The axle assembly 18 may be one unitary structure or two separate stub axles. The axle assembly 18 has at least one wheel assembly 10 supported on each of the ends 20. A plurality of narrow discs assemblies 22 form each wheel assembly 10. The wheel assemblies 10 shown in FIG. 1 each include a first 22a and second 22b narrow disc assemblies.

Figure 2:
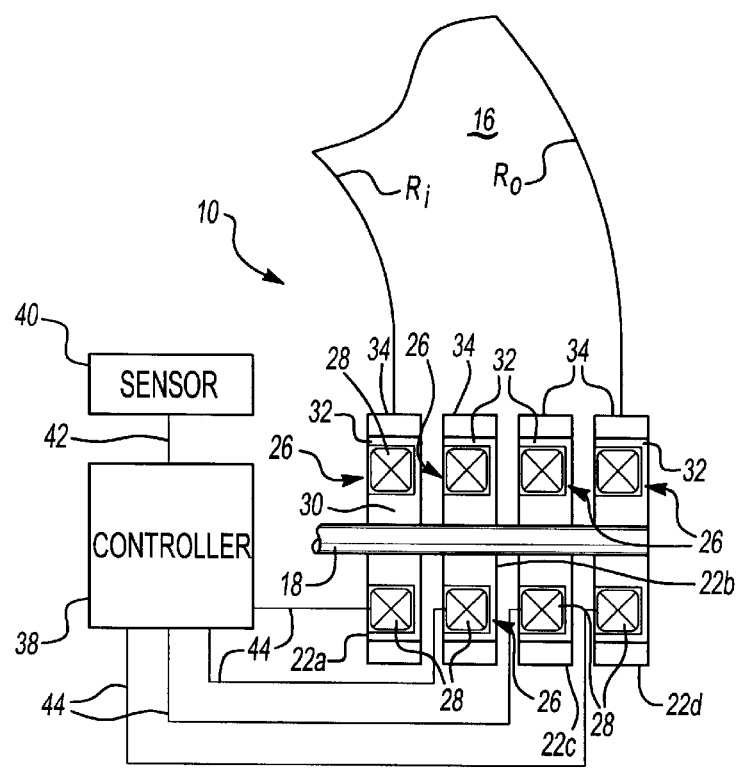
FIG. 2 is a schematic view of another embodiment of the present invention wheels assembly.

Referring now to FIG. 2, a wheel assembly 10 is shown having first 22a, second 22b, third 22c, and fourth 22d narrow disc assemblies supported on an axle 18. The second narrow disc assembly 22b is interposed between the first 22a and third 22c narrow disc assemblies, and the third narrow disc assembly 22c is interposed between the second 22b and fourth 22d narrow disc assemblies. Preferably, the four narrow disc assemblies together are approximately the width of a conventional wheel. It is to be understood that any number of narrow disc assemblies 22 may be used.

Each disc assembly 22 has an independent drive mechanism 26, preferably an electric motor and even more preferably an induction motor, for driving the disc assemblies 22 at slightly different speeds during a vehicle turn to reduce scrub. Preferably, the induction motors 26 are also used as the primary drive mechanisms for the vehicle. The induction motors 26 have a stator 28 and a rotor 30 that has a rim 32 with a tire 34. An internal combustion engine may generate the electric power needed for the induction motors. Each rim 32 and tire is driven by its respective independent drive mechanism 26 so that different speeds may be obtained. Scrubbing across the width of each tire 34 is reduced compared to a conventional wheel and tire because the present invention tires 34 are narrower. Scrubbing is further reduced by independently driving each tire 34 at the speed needed to travel the distance along its radial path.

The vehicle turn has an inner $R_i$ and outer $R_o$ radius, and the first 22a and fourth 22d narrow disc assemblies are arranged at the inner $R_i$ and outer $R_o$ radii, respectively. The second 22b and third 22c narrow disc assemblies also have a turning radius, which is not shown for clarity. In operation, the independent drive mechanisms 26 for each narrow disc assembly 22a, 22b, 22c, 22d apply a rotational force to is respective narrow disc assembly to produce first, second, third, and fourth speeds, respectively. The second speed is greater than the first speed, the third speed is greater than the second speed, and the fourth speed is greater than the third speed for the vehicle turn, shown in FIG. 2. In this manner, each narrow disc assembly 22 may rotate at the speed needed to travel the distance along its radial path so that tire wear from scrubbing is reduced.

The multi-disc wheel assembly 10 may also include a controller 38 connected to the induction motors 26 and a sensor 40 connected to the controller 38 for sensing a vehicle turning radius. The sensor 40 sends a turning radius signal 42 to the controller 38 and the controller 38 produces a speed request signal 44 to the induction motors 26 for producing the desired speeds for each narrow disc assembly 22. The sensor 40 may measure the vehicle turning radius at a steering input device, or in any other suitable manner.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A multi-disc wheel assembly for a vehicle comprising:
   a plurality of narrow discs assemblies forming a wheel assembly, said plurality of narrow disc assemblies including first and second narrow disc assemblies;
   a first independent drive mechanism for applying a rotational force to said first narrow disc assembly to produce a first speed;
   a second independent drive mechanism for applying a rotational force to said second narrow disc assembly to produce a second speed unequal to said first speed during a vehicle turn; and
   an axle assembly with opposing ends, said axle assembly having one of said wheel assemblies supported on each of said ends.

2. The multi-disc wheel assembly as set forth in claim 1 wherein each narrow disc assembly includes a rim and a tire supported on said rim, each rim driven by its respective independent drive mechanism.

3. The multi-disc wheel assembly as set forth in claim 1 further including an axle assembly with opposing ends, said axle assembly having said wheel assembly supported on each of said ends.

4. The multi-disc wheel assembly as set forth in claim 3 wherein said axle assembly has a plurality of wheel assemblies supported on each of said ends.

5. The multi-disc wheel assembly as set forth in claim 1 wherein said independent drive mechanisms are primary drive mechanisms for the vehicle.

6. The multi-disc wheel assembly as set forth in claim 1 wherein said plurality of narrow disc assemblies of said wheel assembly includes a third disc assembly and a third independent drive mechanism for applying a rotational force to said third narrow disc assembly to produce a third speed unequal to said first and second speeds during said vehicle turn.

7. The multi-disc wheel assembly as set forth in claim 6 wherein said plurality of narrow disc assemblies of said wheel assembly includes a fourth disc assembly and a fourth independent drive mechanism for applying a rotational force to said fourth narrow disc assembly to produce a fourth speed unequal to said first, second, and third speeds during said vehicle turn.

8. The multi-disc wheel assembly as set forth in claim 7 wherein said second narrow disc assembly is interposed between said first and third narrow disc assemblies and said third narrow disc assembly is interposed between said second and fourth narrow disc assemblies, said vehicle turn including an inner and outer radius and said first and fourth narrow disc assemblies arranged at said inner and outer radii respectively, said second speed greater than said first speed, said third speed greater than said second speed, and said fourth speed greater than said third speed.

9. The multi-disc wheel assembly as set forth in claim 1 wherein said independent drive mechanisms comprise induction motors having a stator and a rotor.

10. The multi-disc wheel assembly as set forth in claim 9 wherein each narrow disc assembly includes a rim and a tire supported on said rim with said rotor supporting said rim.

11. The multi-disc wheel assembly as set forth in claim 9 further comprising a controller connected to said induction motors and a sensor connected to said controller for sensing a vehicle turning radius, said sensor sending a turning radius signal to said controller and said controller producing a speed request signal to said induction motors for producing said speeds.

12. The multi-disc wheel assembly as set forth in claim 11 wherein said sensor measures said vehicle turning radius at a steering input device.

13. A multi-disc wheel assembly for a vehicle comprising:
   a plurality of narrow discs assemblies forming a wheel assembly, said plurality of narrow disc assemblies including first and second narrow disc assemblies;
   a first independent drive mechanism for applying a rotational force to said first narrow disc assembly to produce a first speed; and
   a second independent drive mechanism for applying a rotational force to said second narrow disc assembly to produce a second speed unequal to said first speed during a vehicle turn; and
   an axle assembly having an end supporting one of said wheel assemblies.

14. The multi-disc wheel assembly as set forth in claim 13 further comprising a controller connected to said independent drive mechanisms and a sensor connected to said controller for sensing a vehicle turning radius, said sensor sending a turning radius signal to said controller and said controller producing a speed request signal to said independent drive mechanisms for producing said speeds.

* * * * *